United States Patent [19]

Kormanik et al.

[11] Patent Number: 4,595,499

[45] Date of Patent: Jun. 17, 1986

[54] GRAVITY BELT THICKENER AND BELT PRESS COMBINATION

[75] Inventors: Richard Kormanik, Mukwonago; Karen Dejewski, Franklin; Robert Brummond, Waukesha, all of Wis.

[73] Assignee: Envirex Inc., Waukesha, Wis.

[21] Appl. No.: 784,904

[22] Filed: Oct. 7, 1985

Related U.S. Application Data

[63] Continuation-in-part of Ser. No. 667,797, Nov. 2, 1984.

[51] Int. Cl.[4] .................. B01D 33/04; B30B 3/00; B30B 9/24
[52] U.S. Cl. .................. 210/202; 210/203; 210/206; 210/216; 210/297; 210/386; 210/296; 210/401; 210/405; 210/456; 100/118; 100/153
[58] Field of Search ............... 210/732, 738, 725, 727, 210/728, 202, 203, 204, 205, 206, 216, 297, 386, 391, 393, 400, 401, 320, 456, 797, 798, 609, 730; 100/118, 119, 120, 151, 152, 153, 154

[56] References Cited

U.S. PATENT DOCUMENTS

| | | | |
|---|---|---|---|
| 2,895,614 | 7/1959 | Komline | 210/401 |
| 3,523,889 | 8/1970 | Eis | 210/95 |
| 3,631,982 | 1/1972 | Lejeune | 210/400 |
| 3,703,963 | 11/1972 | Eguchi | 210/401 |
| 3,891,549 | 6/1975 | Carmel | 210/783 |
| 3,896,030 | 7/1975 | Bahr | 100/118 |
| 3,951,809 | 4/1976 | Kollmar | 210/400 |
| 3,979,296 | 9/1976 | Bastgen | 210/400 |
| 3,984,329 | 10/1976 | Wenzel | 210/400 |
| 4,105,558 | 8/1978 | Heinrich | 210/216 |
| 4,142,971 | 3/1979 | LeFur | 210/400 |
| 4,190,678 | 2/1980 | Pleus | 210/297 |
| 4,303,523 | 12/1981 | Ruppnig | 210/401 |
| 4,305,507 | 12/1981 | Wittkopf | 209/250 |
| 4,341,628 | 7/1982 | Fujinami | 210/216 |
| 4,354,935 | 10/1982 | Austin | 210/400 |
| 4,358,381 | 11/1982 | Takeuchi | 210/202 |
| 4,404,099 | 9/1983 | Austin | 210/400 |
| 4,456,530 | 6/1984 | Eustacchio | 210/401 |
| 4,475,453 | 10/1984 | Davis | 210/783 |

FOREIGN PATENT DOCUMENTS

993981  2/1981  U.S.S.R. .............. 210/400

Primary Examiner—Ernest G. Therkorn
Attorney, Agent, or Firm—Lawrence J. Crain

[57] ABSTRACT

A belt press for use in removing water from sewage sludge, and including a frame, a pair of belts for compressing sludge material therebetween, the said belts being water-permeable whereby water in said sludge may drain through said belts, and a gravity belt thickener adjacent the belt press. The gravity belt thickener includes a belt having a belt flight adapted to support sewage sludge thereon, the belt of the gravity belt thickener having a width greater than the width of the belt of the belt press.

3 Claims, 6 Drawing Figures

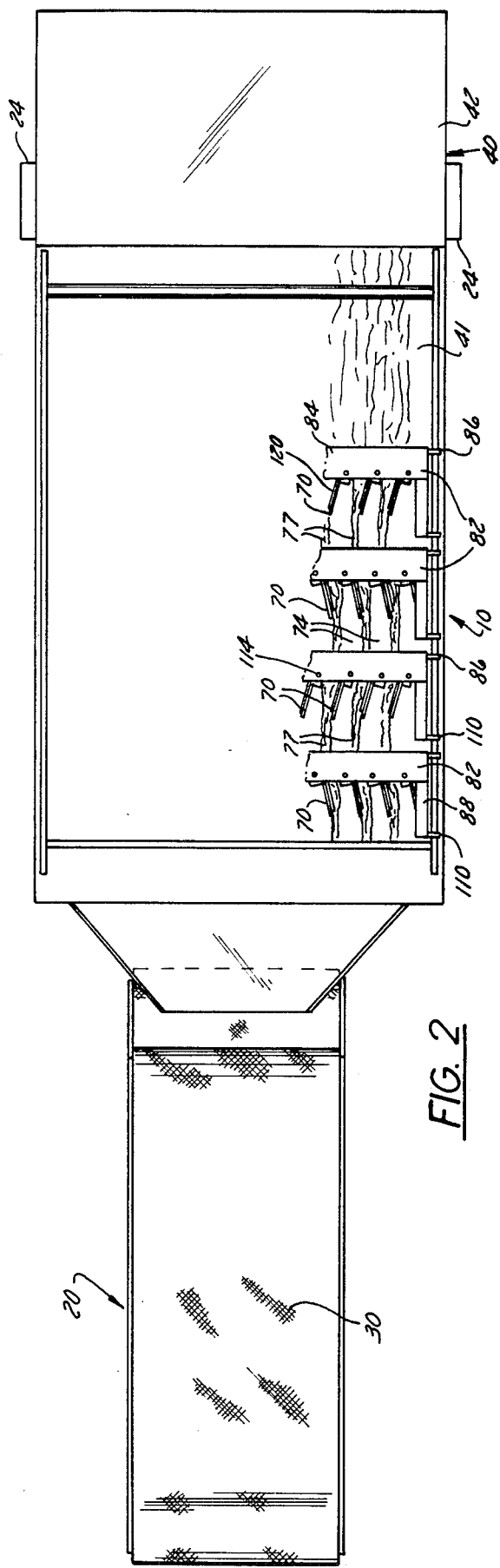

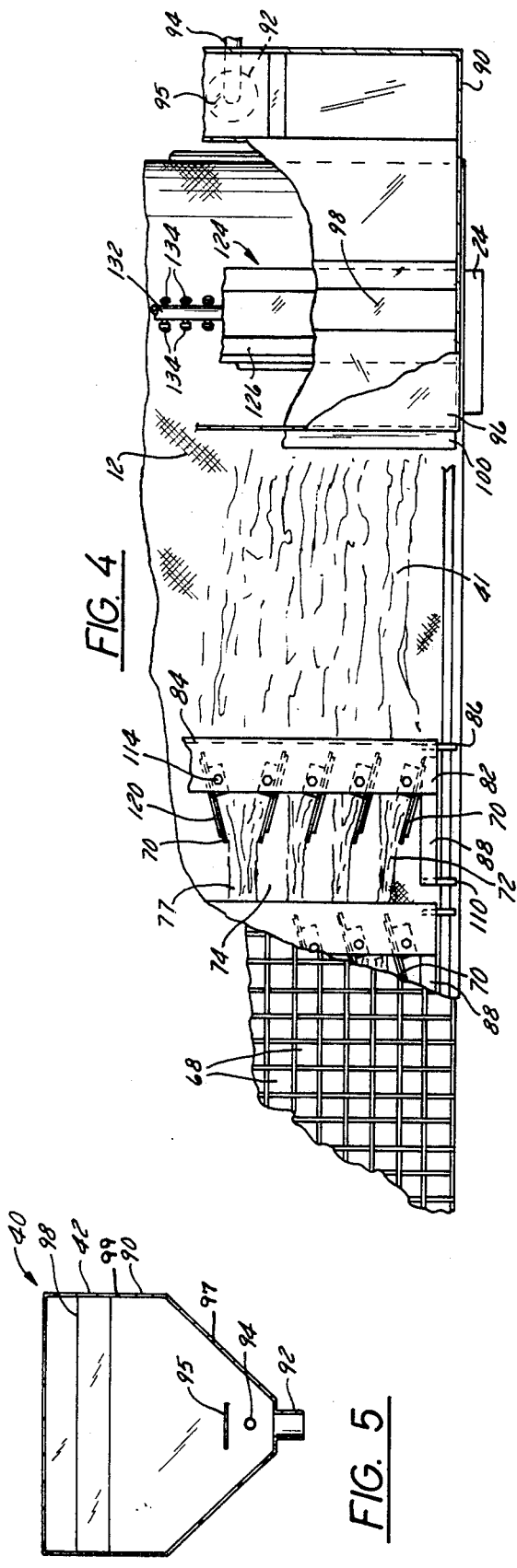
FIG. 4
FIG. 5
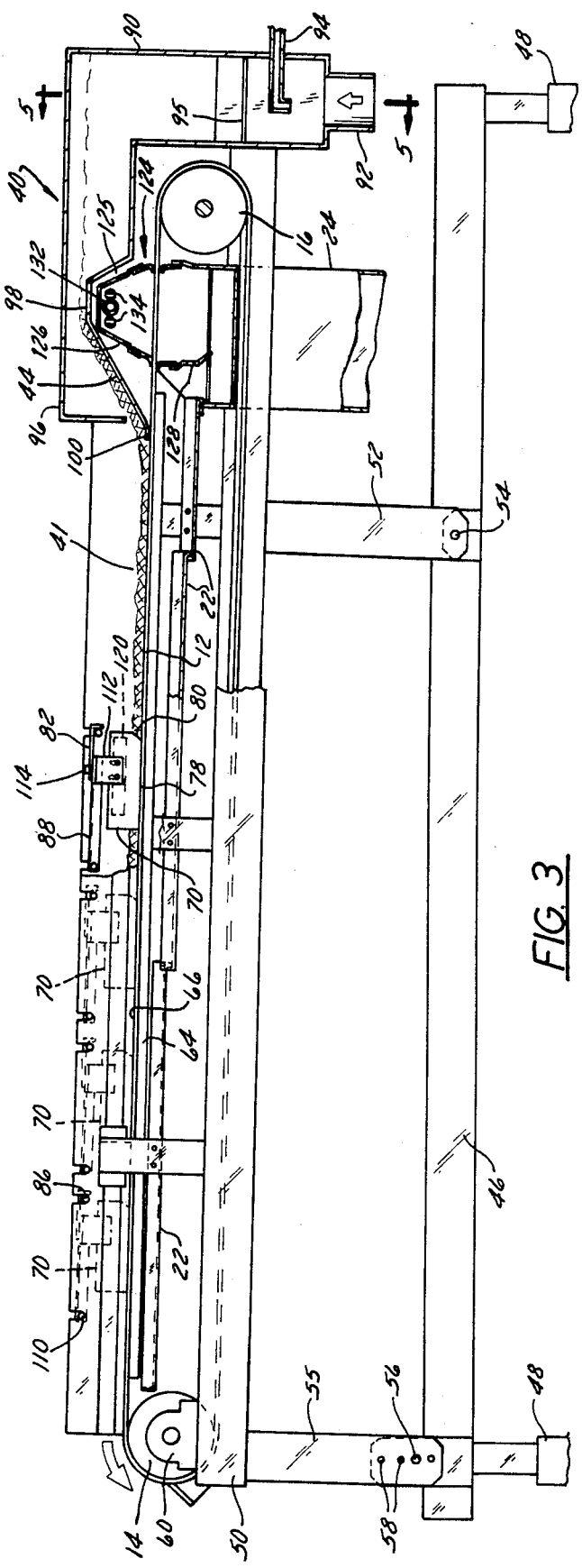
FIG. 3

GRAVITY BELT THICKENER AND BELT PRESS COMBINATION

This is a continuation-in-part of copending Ser. No. 667,797 filed Nov. 2, 1984.

FIELD OF THE INVENTION

The present invention is directed to apparatus for use in treating sewage and more particularly to apparatus for use in removing water from sludge such that the solid material in the sludge can be further processed.

BACKGROUND OF THE INVENTION

In the treatment of sewage sludge, belt presses are commonly employed in the removal of water from the processed sewage sludge so as to permit separation of solid material and water. The solid materials having a high water content are fed to a belt press where this material is compressed between a pair of fabric or mesh belts and the material is compressed between the belts as the belts pass between a plurality of pairs of rollers. As the material is compressed, the water is forced through the permeable mesh belts. The belt presses thus produce a solid cake of material which can then be delivered to additional apparatus for further processing such as drying or disposal.

One of the problems with the prior art apparatus for use in removing water from sludge has been that the costs of manufacture or construction of the belt presses place limits on the capability of the presses to handle large quantities of sewage sludge. If the belt presses are required to handle large quantities of sludge, it is necessary that the belt presses employ relatively wide belts. Use of wide belts requires the construction of relatively long rollers to support the belts. During the operation of the belt press the rollers are subjected to substantial forces and bending moments when they apply compressive force on the belt. With the employment of relatively long rollers in high capacity belt presses, the rollers are subjected to substantial moments, and accordingly, the rollers must have substantial strength and must be supported by bearings capable of withstanding the forces applied by the rollers. Due to the cost of construction of oelt presses having such elongated rollers, it is preferred that the presses employ relatively narrow belts and rollers of reduced length.

Prior art apparatus for use in treating sewage sludge also includes free drain decks or gravity belt thickeners. The prior art gravity belt thickeners include a mesh belt supported by a pair of horizontally spaced apart rollers. The mesh belt includes an elongated horizontal upper belt flight. Sewage sludge having a relatively low solids content is deposited onto one end of the belt and is carried by the belt toward the opposite end of the gravity belt thickener. Water in the sludge drains through the mesh belt, and accordingly the sludge at the discharge end of the belt will have a higher solids content.

Prior art methods and apparatus for use in processing sewage sludge also commonly include the step of mixing a polymer material, such as that described in Great Britain Pat. No. 1,602,677, with the sewage sludge to cause flocculation of the solid materials in the sludge. The formation of flocculant is desired in order to permit increased drainage of the water away from the solid materials during the de-watering or removal of the water from the solid materials. The addition of the polymer material to form the flocculant or floc has the effect of producing a product which is relatively fragile. Rough handling of the floc material causes the floc to break down and inhibits drainage of water from the solids. Once the floc has been handled roughly and broken down, it is then necessary to add additional polymer in order to reform or regenerate the floc and thereby requiring overdosing of polymer. It will be readily understood that the addition of polymer to the liquid sludge results in expense, and repetition of this step of introducing polymer to the sludge should be avoided if possible. Accordingly, it is preferred that the sludge be processed soon after the reaction of polymer with the sludge in such a manner that the water can be removed from the sludge or floc in a single step and the flock is also to be handled in a relatively gentle manner to prevent the floc from breaking down before the removal of the water.

SUMMARY OF THE INVENTION

The present invention provides a combination of a gravity belt thickener and a belt press adapted to be used to remove water from sewage sludge. The gravity belt thickener and the belt press are positioned such that sludge is first delivered to the gravity belt thickener wherein a substantial quantity of water in the sludge is removed by the gravity belt thickener to thereby decrease the volume of the sludge. The thickened sludge material from the gravity belt thickener is then delivered to the belt press wherein the sludge is compressed between a pair of belts for additional removal of water from the sludge material. The present invention provides a gravity belt thickener which has a belt having a width substantially greater than the width of the belts employed in the belt press, and wherein the width of the belts of the belt press is dependent on the reduction of the volume of the sludge achieved by removal of water from the sludge by the gravity belt thickener. The capacity of the belt press is dependent on the volume of the sludge fed to the belt press, not on the water content of the sludge, and the width of the belts of the belt press can be reduced with respect to the width of the belt of the gravity belt thickener proportionately to the reduction in volume of the sludge achieved by the gravity belt thickener. For example, in one form of the invention, where the gravity belt thickener is effective to remove sufficient water from the sludge that the volume of the sludge is reduced to half, the gravity belt thickener will have a belt for supporting the sludge having a width of approximately two meters and the belt press will employ belts having widths of approximately one meter.

The use of the gravity belt thickener and the belt press having a belt width ratio as set forth above permits the use of a relatively narrow belt press in applications where the prior art arrangements required a larger belt press of substantially greater capacity, and use of the narrower belt press substantially reduces the cost of the belt press since the narrow belt presses are less expensive to manufacture than a belt press employing elongated rollers. The use of the smaller belt press also provides for an overall reduction in the volume of apparatus needed to remove water from the sludge.

Various other features and advantages of the invention will be apparent by reference to the following description of a preferred embodiment, from the claims and from the drawings.

BRIEF DESCRIPTION OF THE DRAWINGS

FIG. 1 is a side elevation view of a gravity belt thickener and belt press embodying the present invention.

FIG. 2 is a plan view of the gravity belt thickener and belt press illustrated in FIG. 1.

FIG. 3 is an enlarged cross-section elevation view of the gravity belt thickener and distribution box illustrated in FIG. 1.

FIG. 4 is a partial plan view of the gravity belt thickener and distribution box illustrated in FIG. 3.

FIG. 5 is a partial cross section view taken along line 5—5 in FIG. 3.

Figure 6:
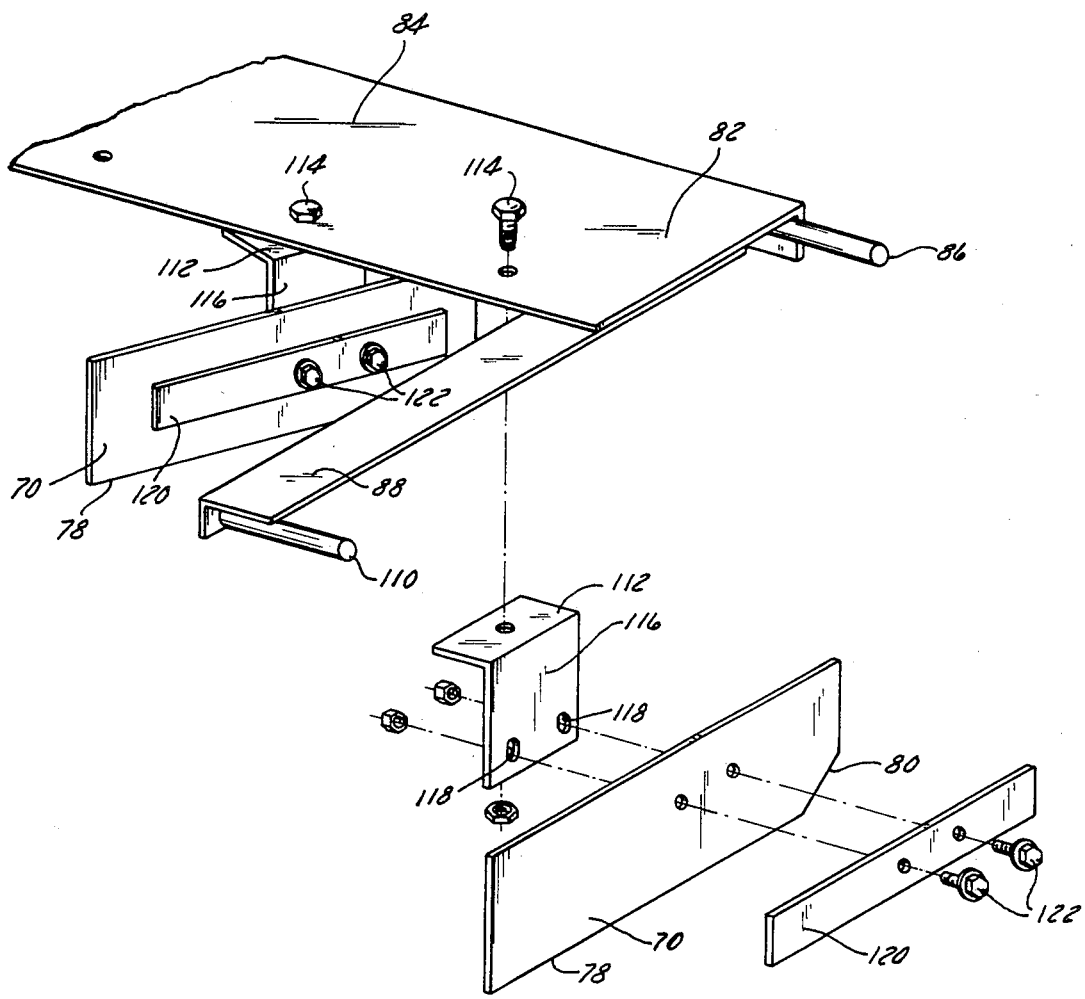
FIG. 6 is an enlarged exploded perspective view of the plow support means illustrated in FIGS. 2 and 3–4.

Before describing at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a de-watering table or gravity belt thickener 10 embodying the present invention and adapted to receive generally liquid activated sludge material from waste treatment means in a waste treatment facility. The gravity belt thickener 10 is intended to provide a means for removing water from the sludge so as to reduce the liquid content of the sludge and to facilitate further processing of the solid components of the sludge.

Generally the gravity belt thickener 10 includes a fabric or mesh belt 12 supported by a pair of spaced-apart rollers 14 and 16 positioned at opposite ends of the gravity belt thickener. The generally liquid sludge is deposited on one end of the upper flight of the belt 12. The mesh belt 12 is of the type conventionally used in gravity belt thickeners and belt presses and is sufficiently fine that it can support the solid material of the sludge, but the water in the sludge drains through the belt. Solid material is carried to the opposite end of the gravity belt thickener 10 and is deposited onto a belt 18 of a belt press 20 by means for guiding the sludge from the belt of the gravity thickener to the pair of belts of reduced width of the belt press.

The belt press 20 includes a frame 26 supporting a plurality of parallel horizontally extending rollers. The rollers are positioned so as to support a pair of water permeable belts 18 and 30 of the type employed on the gravity belt thickener 10, these belts 18 and 30 being supported such that they can compress or squeeze the thickened sludge and thereby force liquid material out of the sludge and further reduce the water content. More specifically the belt press 20 includes an upper belt 30 supported by a plurality of rollers 32. The lower belt 18 is supported by a plurality of rollers 34. Solid material is deposited on a flight 35 of the lower belt 18 by the gravity belt thickener 10. The upper belt 30 includes a portion or flight 36 which is located above the flight 35 so as to house the sludge material therebetween. The pair of belts 18 and 30 having sludge material sandwiched therebetween pass around a plurality of rollers 38, and the belts 18 and 30 are subjected to substantial tension. Accordingly, as the belts pass around the rollers 38, they apply a substantial compressive force on the sludge therebetween. Since the belts 18 and 30 are comprised of a mesh or fabric material, the water in the sludge is forced through the belts 18 and 30 and separated from the solid material.

In a preferred form of the invention the gravity belt thickener 10 will have a belt 12 having a width which is substantially greater than the width of the belts 18 and 30 of the belt press 20. The capacity of the belt press 20 to handle sludge is dependent on tne volume of the sludge rather than the volume of solid material in the sludge. The size of the belt press can thus be reduced in direct proportion to the reduction of the volume of the sludge being fed to the belt press. By providing a gravity belt thickener to remove water from the sludge prior to feeding the sludge to the belt press 20, the volume of the sludge can be decreased substantially, and the capacity of the belt press can be reduced. While the capability of the gravity belt thickener 10 to remove water from the sludge is dependent in part on the characteristics of the sludge, as an example of one application of the invention, it has been found that a belt press 20 having belts 18 and 30 approximately 1 meter wide and a gravity belt thickener 10 having a belt 2 meters wide are effective in dewatering sludge while being relatively economical to manufacture.

While in the illustrated arrangement, the belt press is shown as being supplied by a single gravity belt thickener in other applications, two or more gravity belt thickeners 10 could supply thickened sludge to a single belt press 20.

FIG. 1 also generally illustrates a means for delivering sludge to the de-watering table or gravity belt thickener 10 in a generally uniform flow pattern. This means, which comprises a distribution box 40, includes a means for mixing a polymer material with the sludge to provide formation of a floc immediately prior to delivery of the sludge to the gravity belt thickener 10. The distribution box 40 is mounted on one end of the gravity belt thickener 10. The distribution box 40 comprises a tank or housing 42 (FIG. 3) for holding the generally liquid sludge material. Liquid sludge is supplied to the distribution box 40 through coupling 92 adapted to be connected to a pipe from a clarifier or the like. A conventional polymer material is supplied to the distribution box through a polymer supply coupling 94. The polymer mixes with the liquid sludge in the distribution box 40 and causes flocculation or formation of floc.

The distribution box also includes a discharge ramp 44 wherein sludge from the distribution box 40 can flow in a generally uniform pattern down onto the end of the belt 12 of the gravity belt thickener. The discharge ramp 44 is smooth and has a relatively gentle slope so as to control the turbulence of the sludge as it is deposited on the belt 12. The ramp 44 also has a width which is substantially the same as that of the belt such that the sludge is deposited evenly over the entire width of the belt 12 of the gravity belt thickener.

While the gravity belt thickener 10 could have other constructions, in the particular arrangement illustrated, it includes an elongated frame 46 supported by vertical legs 48. The elongated frame 46 in turn supports an elongated belt supporting frame 50. The elongated belt supporting frame 50 is supported at one end by legs 52. The lower ends of the legs 52 are pivotally connected by pins 54 to the elongated frame member 46. The lower ends of the legs 55 supporting the opposite end of the elongated belt supporting frame 50 are joined by pins 56 to the opposite end of the elongated frame 46. In a preferred form of the invention, either the lower ends of the legs 55 or the frame member will be provided with a plurality of vertically spaced holes 58 adapted to receive the pins 56. That end of the frame 50 is thus supported for vertical adjustment so that the height of one end of the upper flight of the belt 12 of the gravity belt thickener 10 can be varied with respect to the height of the other end of the belt. In one preferred form of the invention, the gravity belt thickener has been found to perform particularly well if the belt is elevated at an angle of approximately 1½° so that the upper belt flight carries the sludge upwardly toward the discharge end of the gravity belt thickener. While the gravity belt thickener 10 is described as providing for adjustment of the angle of inclination of the belt 12, in other arrangements the frame could be rigid and have a fixed inclination.

Means are also provided for rotatably supporting the rollers 14 and 16 on opposite ends of the elongated frame 50. In the illustrated construction the means for supporting the rollers 14 and 16 includes pillow blocks 60 at one end of the frame 50, the pillow blocks 60 supporting bearings, in turn, supporting the roller 14. The roller 16 is supported by a conventional takeup bearing provided to permit control of belt tracking.

The gravity belt thickener 10 also includes means for catching the water draining through the belt 12. While various means could be provided, in the illustrated arrangement, a drain pan 22 is supported by the belt supporting frame 50 and is positioned beneath the upper flight of the belt 12, the drain pan 22 extending from one end of the belt 12 along substantially its entire length. The drain pan 22 includes a sloped bottom terminating in a discharge coupling 24, the coupling 24 being adapted to be connected to a drain pipe (not shown) whereby water draining through the belt 12 of the gravity belt thickener 10 can be conveyed to a suitable processing tank or other disposal means.

Means are also provided for rotatably driving at least one of the rollers 14 and 16 of the gravity belt thickener so as to drive the belt at a suitable speed. In a preferred form of the invention the means for driving the belt will include a variable speed drive so that the belt speed can be adjusted to accomodate the characteristics of the sludge being deposited on the belt.

Means are also provided for supporting the upper flight of the belt 12 in planar relation and for scraping the lower surface of the upper flight of the belt 12 to thereby facilitate removal of water from the belt and facilitate consequent removal of water from the solid material supported on the belt. In the illustrated construction, this means includes a rigid planar grid 64 having a flat upper surface 66 for supporting the belt 12 and including a lattice work or grid structure forming a plurality of openings 68 (FIG. 4) adapted to permit water to readily drain through the grid 64. The rigid planar grid 64 is positioned beneath the upper flight of the belt 12 such that the upper surface 66 of the grid 64 engages the lower surface of the upper flight of the belt 12. As the belt 12 moves from right to left as seen in FIG. 3 and from one end of the gravitY belt thickener 10 to the otherr, it moves across the upper surface 66 of the grid structure 64. As the rid scrapes along the bottom of the belt 12 it causes water to be removed from the belt and thereby improves the drainage of the water through the belt. The upper surface 66 of the grid 64 includes sharp upper edges, and these sharp upper edges scrape the water off of the underside of the belt 12 and prevent water from adhering by surface tension to the belt.

In operation of the gravity belt thickener 10, sludge having, for example, less than 1% solid material is deposited by the distribution box 40 on an end of the upper belt flight of the gravity belt thickener to form a pool of generally liquid material. The belt 12 is supported such that the upper flight is inclined slightly upwardly and away from the distribution box 40 and away from the pool of liquid material. As the belt moves away and upwardly from the pool of liquid material, solid materials are carried by the belt 12 out of the pool and move with the belt toward the opposite end of the gravity belt thickener. As the solid material or floc moves along the belt, the water with this material will tend to drain through the belt and at the end of the belt the thickened sludge will comprise, for example, about 4% or more solids.

Means are also provided for causing controlled movement of the solid material or floc on the surface of the belt as the floc moves with the belt toward the discharge end of the belt. This means for causing controlled movement of the floc is intended to improve discharge of water from the floc, i.e., drainage of the water through the belt. This means includes a plurality of plows 70 supported above the upper surface of the belt and supported in such a manner as to cause the floc on the upper surface of the belt to form rows or furrows 72 as illustrated in FIG. 4, and to cause the floc to move back and forth on the belt as the belt moves toward the discharge end. The plows 70 also cause the formation of troughs 74 between the furrows 72 of floc material. As the plows roll the sludge material over to form the rows or furroughs, water trapped in the sludge is released, and the provision of the furrows 72 and troughs 74 thereby providing open areas of the belt surface permits water to drain from the furrows into the troughs, and the water can then drain through the belt 12. As the belt 12 continues to move, the next row of plows 70 will then cause the floc to be moved or rolled laterally again on the belt 12 such that the furrows 72 tend to be rolled over as the belt moves toward the discharge end. This rolling of the furrows 72 and floc material further improves the drainage of the water from the floc and increases the efficiency of operation of the gravity belt thickener 10. In a preferred form of the invention the plows engage the surface of the mesh belt so as to scrape the surface of the belt, removing the sludge from portions of the surface of the belt, to form the troughs. If the sludge is distributed uniformly across the surface of the belt, the sludge layer tends to seal the mesh and restricts drainage through the belt. By removing the sludge layer from portions of the mesh belt, free drainage is provided.

In the illustrated construction a plurality of rows 76 of the plows 70 are provided, the rows 76 being spaced apart and extending along the entire length of the gravity belt thickener beyond the pool 41. Each plow 70 comprises a relatively thin generally planar blade, the plow blades lying in generally parallel planes spaced apart across the width of the belt 12. Each plow 70 is positioned at an acute angle with respect to the longitudinal axis of the gravity belt thickener such that as the floc moves along the length of the gravitY belt thickener it will impinge against first one plow and then another and will be rolled back and forth across the upper surface of the belt 12.

While the plows 70 could have other constructions, in the illustrated arrangement, each plow 70 comprises a thin, flat rectangular planar blade having a generally planar bottom edge 78 adapted to be positioned so as to engage the upper surface of the belt 12. In the illustrated arrangement, the leading end of the plow, i.e., that end facing away from the direction of movement of the upper belt flight, includes a bevelled or rounded edge 80. This bevelled or rounded lower edge 80 prevents the plow 70 from catching or snagging the fabric belt 12 as the belt moves beneath the forward edge of the plow. While the length of the plow blades could vary. in one preferred embodiment the plow blades can have a length of approximately 12 inches.

Means are also provided for supporting the plows 70 adjacent the surface of the upper flight of the belt 12. While the plow supporting means could have other constructions, in the illustrated arrangement, this means includes a plurality of horizontally extending plow support frames 82 supported by the frame 50 above the upper belt flight in spaced relation from the upper flight and extending across the belt 12 perpendicularly to the direction of movement of the upper belt flight. In the particular construction illustrated in the drawings each plow support frame includes an elongated support plate 84 with the opposite ends of the plate 84 supported by stub shafts 86. The stub shafts 86 are in turn supported by the frame 50. Each plow support frames 82 also includes support arms 88 welded to the opposite ends of the elongated support plate 84 and having free ends including stub shafts 110 also supported by the machine frame 50. The plow support frames 82 each support a plurality of hangers 112 suspended from the lower surface of the plow support frames 82. Each hanger 112 comprises an angle having a planar horizontal portion adapted to be positioned adjacent the lower surface of the elongated support plates 84 and secured thereto by a bolt 114 extending through the horizontal portion and through a hole in the elongated support plate 84. The hanger 112 also includes a vertical planar portion 116 having a smooth vertical surface adapted to support one of the plows 70 for vertical slideable movement. To facilitate such vertical movement of the plows 70, the vertical portion 116 of the hanger 112 includes a pair of vertically extending slots 118 and the plow 70 is supported between a backing plate 120 and the vertical portion 116 of the hanger. A pair of bolts 122 extend through the backing plate 120, plow 70 and the slots 116 of the hanger 112 so as to loosely secure these members together, and the vertically extending slots 118 permit relatively free vertical movement of the bolts 122 in the slots 118 so as to provide for floating movement of the plows 70 with respect to the hanger 112.

In operation of the plows 70, the lower edge of the plows 70 will rest on the upper surface of the belt 12, and since the plows 70 are relatively free floating, the weight of the plows 70 will maintain them against the surface of the belt 12. The angle of the position of the plows 70 with respect to the direction of movement of the belt 12 can also be readily adjusted by pivoting the plows 70 about the vertical axis of the bolt 114 securing the hangers 112 to the elongated support plate 84.

The preferred angular position of the plow blades 70 depends upon the length of the plow blades and upon the solid content of the sludge deposited on the mesh belt. Since water drains through the belt as the sludge moves along the length of the gravity belt thickener, the solid content of the sludge is greater at the discharge end of the belt. The water content of the sludge may also vary with different applications of the gravity belt thickener and with the source of supply of sludge to the gravity belt thickener. The means provided by the present invention for permitting adjustment of the plows independently and facilitating relatively easy adjustment of the plows permits the plows to be properly positioned so as to best handle the sludge supplied to the gravity belt thickener.

With the illustrated arrangement, the plow support frame 82 can also be pivoted about the stub shafts 86 supporting the opposite ends of the elongated support plates 84 so that the plows can be lifted away from the belt 12 for cleaning or maintenance.

Referring now more particularly to the distribution box 40, it comprises a means for mixing a polymer material with the sewage sludge to provide for formation of the floc. The distribution box 40 also provides a means for containing the sludge and polymer in a relatively quiescent state to permit maximum formation of the floc. The distribution box 40 comprises a generally vertically oriented rectangular chamber 90 with a lower end including a coupling 92 adapted to be connected to a pipe for supplying liquid sludge material to the distribution box. In a preferred form of the invention the liquid sludge supplied to the distribution box will also include a small amount of primary sludge, for example 20%, mixed with the activated sludge to be processed. A means is also provided for introducing a liquid polymer into the sludge housed in the chamber 90. While various means could be provided for introducing the polymer into the distribution box 40, in the illustrated construction a polymer supply line 94 enters a lower end of the distribution box to cause polymer to be mixed with the sludge as the sludge enters the distribution box 40. Suitable polymers are conventional and will not be described in detail.

The distribution box 40 also includes means for depositing the sludge material containing floc onto the belt 12 of the gravity belt thickener and for evenly distributing that material across the surface of the belt. The distribution box is constructed so as to relatively gently deposit the sludge material onto the belt in such a manner that the floc formed in the distribution box 40 is not broken up. The floc material formed in the distribution box is relatively fragile and rough handling or turbulence of the liquid material will cause the floc structure in the sludge to break down. Destruction of the floc decreases the facility of the floc or sludge material to drain.

Referring more particularly to the means of the distribution box for depositing the sludge material on the belt 12, the distribution box 40 includes a generally horizontally extending chamber 96 projecting horizontally from the upper end of the vertical chamber 90 of the distribution box. The horizontal chamber 96 extends over one end of the gravity belt thickener and includes a free end housing a broad crested dam or weir 98 for restraining the sludge material in the distribution box. In a preferred form of the invention, the weir 98 includes a relatively wide, flat upper surface and this broad crest on the weir 98 minimizes break up of the floc as compared to a sharp crested weir. The ramp 44 extends downwardly from the upper portion of the weir 98 and includes a lower or discharge end 100 positioned closely adjacent to the surface of the belt 12.

In operation, the sludge material in the distribution box 40 flows over the top of the weir 98 and down the ramp 44 onto the end of the belt 12. In a preferred form of the invention the ramp 44 will have a relatively gradual incline such that the sludge will be deposited relatively gently on the upper surface of the belt 12 and in such a manner that the floc will remain intact. In a preferred form of the invention, the upper edge of the weir 98 is horizontal such that the sludge will flow over the weir 98 across its entire length in the direction transverse to the direction of movement of the belt and so as to distribute the sludge or floc material evenly across the entire width of the belt 12 of the gravity belt thickener 10.

In a preferred form of the invention means are further provided for washing or cleaning the belt 12 so as to facilitate drainage of water through the belt. During operation of the gravity belt thickener 10, as the belt carries floc away from the pool 41, and as the floc is distributed on the belt by the plows, solid material can become lodged in the mesh of the belt and can restrict drainage of water through the belt and thereby prevent efficient operation of the gravity belt thickener. The means for washing the belt provides a means for continuously cleaning the belt to remove solid particles from the belt mesh.

In the illustrated construction the gravity belt thickener 10 includes a belt washing assembly mounted beneath the horizontally extending portion of the distribution box 40 and adapted to clean the belt and remove any solid material from the belt mesh immediately before the floc is deposited on the belt by the distribution box.

In the particular arrangement illustrated the means for washing the belt includes a spray assembly 124 having an upper housing 126 housed in the cavity 125 provided by the lower surface of the weir 98 and positioned above the upper flight of the belt 12. The spray assembly 124 also includes a lower housing 128 positioned immediately below the upper housing and the belt flight. The housings 126 and 128 span the width of the belt 12. The upper housing 126 contains a spray header including a water pipe 132 having a plurality of spray nozzles 134 extending along the length of the water pipe 132.

In operation of the spray assembly 124, water from the nozzles 134 will impinge against the belt 12 and force any solid material embedded in the belt mesh through the belt, and it will drain into the lower housing 128.

One of the features of the illustrated construction is that the distribution box 40 and spray assembly 124 are constructed so that they fit together in a compact nested relation, with the upper housing conveniently positioned in the cavity 125 provided by weir 98.

It should also be understood that while in the present invention the spray assembly 124 includes only a single spray header positioned above the belt 12, in other alternative embodiments of the invention, spray means could also be positioned beneath the belt 12 so that both sides of the belt would be sprayed.

By use of a gravity belt thickener or free drain deck 10 of the type as described above in combination with the belt press 20 in the illustrated relation, and wherein the belt of the gravity belt thickener has a width approximately twice that of the belt press, it has been found that substantially greater quantities of sewage sludge can be processed by the belt press 20 than could be processed using a similar belt press alone or in prior art combinations. The gravity belt thickener 10 has a capacity based on its capability to drain water out of the sludge. A belt press, on the other hand, has a capacity based on the total volume of the sludge. By using the combination of the gravity belt thickener 10 and belt press 20 as described above, water will be removed from the sludge prior to delivery of the sludge to the belt press, and the capacity of the belt press can be based on the anticipated solids content of the sludge, not on the total volume of the sludge to be processed.

Another advantage of the illustrated combination and the employment of a gravity belt thickener and belt press in series and in immediately adjacent relation as described herein is that polymer is added to the sludge only once, just prior to the sludge being deposited on the gravity belt thickener. Since the floc is handled by the belt press immediately after it is handled by the gravity belt thickener, the floc remains intact and it is not necessary to add polymer a second time when the sludge is supplied to the belt press.

Various features of the invention are set forth in the following claims.

We claim:

1. Apparatus for use in removing water from sewage sludge, the apparatus comprising:

a belt press including a frame, a pair of belts for compressing sludge material therebetween, said belts being water-permeable whereby water in said sludge may drain through said belts, and means for supporting said belts so as to compress sludge material between said belts, said means for supporting including a plurality of rollers supported by said frame, said belts having a first width;

means for reducing the water content of the sludge prior to depositing the sludge on the belt of the belt press, said means for reducing the water content of the sludge including at least one gravity belt thickener adjacent said belt press, said gravity belt thickener including a belt having a belt flight adapted to support sewage sludge thereon and having opposite ends, one of said ends being supported by a first roller and being adapted to have sludge deposited thereon and the other of said ends being supported by a second roller and comprising a sludge discharge end, said gravity belt thickener belt being water-permeable whereby water drains through said belt when sewage sludge is deposited on said belt and solid material in the sewage sludge is supported by said belt, said discharge end of said belt flight being positioned adjacent said belt press such that sludge from said belt of the gravity belt thickener is deposited on one of the belts of the belt press, and said belt of said gravity belt thickener having a width greater than the width of said belt of said belt press;

wherein the ratio of the width of the belt of the gravity belt thickener and the width of the belt of the belt press is proportional to the ratio of the solids content of the sludge deposited on said one of said ends of the belt of the gravity belt thickener and the solids content of the sludge on said discharge end of the belt of the gravity belt thickener; and means for guiding the sludge from the belt of the gravity thickener to the pair of belts of reduced width of the belt press.

2. Apparatus as set forth in claim 1 and further including means for use in mixing a polymer material with sewage sludge to form a floc and for depositing the sewage sludge on the other than the discharge end of said ends of said belt flight, said means for mixing and depositing including a container adapted to be mounted adjacent said other than the discharge end of said ends of said belt flight, said container being adapted to be connected to a source of sewage sludge, means for supplying polymer to said container for mixing polymer with said sewage sludge in said container to form a flocculated material, and means for depositing the sludge containing the flocculated material onto said other than the discharge end of said ends of the belt flight in a uniform and continuous flow and uniformly across the width of said other than the discharge end of said ends of said belt flight.

3. Apparatus for use in removing water from sewage sludge, the apparatus comprising:

a belt press including a frame, a pair of belts for compressing sludge material therebetween, said belts being water-permeable whereby water in said sludge may drain through said belts, and means for supporting said belts so as to compress sludge material between said belts, said means for supporting including a plurality of rollers supported by said frame, said belts having a first width;

means for reducing the water content of the sludge prior to depositing the sludge on the belt of the belt press, said means for reducing the water content of the sludge including at least one gravity belt thickener means adjacent said belt press, said gravity belt thickener means including belt means adapted to support sewage sludge thereon, a portion of said thickener adapted to apply a flocculating polymer to said sludge, a portion of said belt means being adapted to have sludge deposited thereon and another portion of said belt means adapted to discharge sludge, said belt means being water-permeable whereby water drains through said belt means when sewage sludge is deposited on said belt means and solid material in the sewage sludge is supported by said belt means, said portion of said belt means adapted to discharge sludge being positioned adjacent said belt press such that sludge from said belt means is deposited on one of the belts of the belt press such that the transfer of sludge from said gravity belt thickener to said belt press is accomplished without a supplemental application of polymer and said belt means having a width greater than the width of said belts of said belt press by an amount directly proportional to the amount of water removed from the sludge by said gravity belt thickener means; and means for guiding the sludge from the belt of the gravity thickener to the pair of belts of reduced width of the belt press.

* * * * *